United States Patent [19]

Bjerk et al.

[11] 3,898,361

[45] Aug. 5, 1975

[54] FLUOROELASTOMER-BASED COMPOSITE MATERIAL

[75] Inventors: Roger O. Bjerk, Edelstein; William D. Brandon; Frederick S. Engelking, both of Peoria; John P. Jero, Washington, all of Ill.

[73] Assignee: Caterpillar Tractor Co., Peoria, Ill.

[22] Filed: June 4, 1973

[21] Appl. No.: 366,967

[52] U.S. Cl. ............... 428/325; 428/332; 428/421; 260/42.27; 260/42.18; 260/42.22
[51] Int. Cl.² .......................................... B32B 19/02
[58] Field of Search ................ 161/162, 189, 165; 260/42.27, 42.18, 42.22; 428/325

[56] References Cited
UNITED STATES PATENTS

| | | | |
|---|---|---|---|
| 2,944,927 | 7/1960 | Dosmann | 161/189 X |
| 3,007,890 | 11/1961 | Twiss et al. | 260/38 |
| 3,056,709 | 10/1962 | Rising et al. | 161/250 X |
| 3,320,107 | 5/1967 | Christenson et al. | 156/89 |
| 3,505,167 | 4/1970 | Smarook | 161/189 |
| 3,585,102 | 6/1971 | Burgess | 161/162 |
| 3,607,606 | 9/1971 | Beninga | 161/162 |
| 3,607,607 | 9/1971 | Beninga | 161/162 X |
| 3,684,062 | 8/1972 | Johnson | 188/251 R |
| 3,738,901 | 6/1973 | Matsushima et al. | 161/162 X |
| 3,748,301 | 7/1973 | Kuhar et al. | 260/41 A |
| 3,799,832 | 3/1974 | Reick | 161/189 X |

*Primary Examiner*—George F. Lesmes
*Assistant Examiner*—Patricia C. Ives
*Attorney, Agent, or Firm*—Phillips, Moore, Weissenberger Lempio & Strabala

[57] ABSTRACT

High modulus asperities are incorporated into a fluoroelastomer matrix to provide a material which, when cured, exhibits high, stable coefficients of friction over a wide temperature range.

3 Claims, 2 Drawing Figures

FLUOROELASTOMER-BASED COMPOSITE MATERIAL

BACKGROUND OF THE INVENTION

This invention relates to composite materials. More specifically, this invention relates to composite friction materials which exhibit high, stable, coefficients of friction over a wide temperature range.

The elastomeric materials heretofore proposed for use as materials have generally proven to be unsatisfactory when exposed to high ambient working temperatures such as encountered, for example, in clutch and brake applications in heavy duty service vehicles. Typically, such materials have been based on heat-hardenable resins such as phenol-aldehyde resins which tend to heat-decompose under the high peak and bulk temperature conditions created by the sustained and/or heavy loading forces experienced in the clutch and brake systems of these vehicles while operating. As a result of this decomposition, the physical properties of these materials typically deteriorate, and the consequent softening of the material and dispersal of the products of heat decomposition generally interfere with the functioning of the friction unit. Furthermore, many times after friction material comprising a partially heat-decomposed heat-hardenable resin has cooled, the material will exhibit a higher coefficiency of friction than did the original material.

These conditions, as well as other problems associated with these and similar materials, result in a loss of efficiency in the friction unit and unreliability in the service vehicle, which is highly undesirable.

Many attempts have been made to obviate the problems associated with the elastomers in general use as friction material basis. Many different resins have been experimented with, in attempts to obtain a friction material which possesses a high, stable coefficient of friction over a wide temperature range. Modification of the heat-hardenable resins with other polymeric materials has been attempted. Many of these friction material formulations have not performed well. Other formulations have required multi-step procedures which are costly in terms of labor and frequently in terms of the material used in these formulations.

Importantly, also, many of these known friction materials require a bonding agent to affix them to the backing plate or "core" portion of the friction element. This requirement severely restricts the scope of the molding methods and mold configurations employable in forming these friction elements. In injection molding, for example, the bonding agent is subject to scuffing during the molding process, which deactivates or destroys the bond and renders this molding process useless with these friction elements. In general, where bonding agents must be utilized, only compression molding and relatively simple mold configurations can be employed in the process of molding the friction element.

In order to obtain a friction material with a usefully high coefficient of friction which is stable over a wide temperature range, the industry has most usually used nonresilient inorganic friction materials such as sintered bronze. Although the friction characteristics of this and similar metallic materials have been generally satisfactory under high temperature conditions, the high modulus or lack of resiliency of these materials and their resultant inability during operation to conform to the friction element mating surface and absorb adequate energy result in relatively high wear rates and shortened life. Furthermore, great care must be taken in the type of oil used in conjunction with such friction materials during use to ensure that the desired coefficient of friction is not impaired.

It is therefore an object of this invention to provide a friction material composition with a high, stable coefficient of friction over a wide range of dynamic operating conditions.

It is a further object of this invention to provide a friction material composition with high dynamic and static coefficients of friction over a wide temperature range.

It is a further object of this invention to provide a friction material composition which can readily be bonded to a metal core material.

It is an additional object of this invention to provide a friction material composition which can be compression molded, and which can be molded in conjunction with complex mold configurations.

It is also an object of this invention to provide a conformable, long-wearing friction material composition with a high, stable coefficient of friction over a wide temperature range.

Other objects and purposes of this invention will be apparent to those skilled in the art from the disclosure contained herein.

BRIEF SUMMARY OF THE INVENTION

Broadly, the composite friction material of this invention comprises a fluoroelastomer compounded with minute particles of a friction-producing agent, or "high modulus asperities." The fluoroelastomer matrix has excellent properties of thermal stability, and at the same time provides a relatively low modulus resilient matrix which permits the friction material to conform readily to inherently rapid changes between it and its mating surface, thereby distributing dynamic stresses and energy absorption over a much larger true friction surface area than is permitted with high modulus metallic or other non-resilient materials.

Maximum energy absorption rates of from about 3 to about 5 $HP/in^2$ of fluoroelastomer friction material are typical. In comparison with these high modulus materials, such a low modulus matrix significantly increases the load-carrying capabilities of the friction element of which it is a part, and further, possesses superior wear characteristics when compounded with high modulus asperities as herein disclosed.

The high modulus asperities, generally glassy or related substances, are compounded with the fluoroelastomer in sufficient quantities to produce a relatively high concentration of these asperities on the frictional surface of the fluoroelastomer matrix. In addition to acting as the friction-producing agent in the friction material, these asperities further serve to strengthen the support matrix and lessen compression set or permanent deformation under applied loads.

The compounded friction material is then applied to the core of the friction element, for example as disclosed in copending U.S. application Ser. No. 307,420, by William D. Brandon, filed Nov. 17, 1972, of common assignment herewith.

of the surface of material according to the invention after this surface has been "worn in." The ball and rod-like asperities are clearly seen with the worn flat surfaces thereon apparent.

Figure 2:

FIG. 2 is a photomicrograph (at 500X magnification) of another sample of material according to the invention. The asperities are noted to have flattened upper surfaces produced upon "wearing in" of the material.

DETAILED DESCRIPTION OF THE INVENTION

This invention provides a fluoroelastomer based material having vitreous particles dispersed therethrough. This composite material exhibits tensile strengths comparable with the fluoroelastomers alone, but however exhibits better set and stress relaxation resistance than the fluoroelastomers alone.

The fluoroelastomers useful in this invention are exemplified by VITON E60C (E. I. DuPont, Inc., Wilmington, Delaware), a copolymer of hexafluoropropylene and polyvinylidene fluoride, and a similar copolymer, Fluorel FC2170 (the 3M Company, Minneapolis, Minnesota). Preferably, Viton E60C or Fluorel FC2170 are employed to form the matrix of the friction material.

To form the composite material of the invention, the fluoroelastomer is compounded with particles of a relatively hard material, herein referred to as "asperities." These asperities are preferably glassy materials or ceramic materials in very small beads, fibers or other irregular shapes.

Although the useful size of these asperities may vary somewhat according to the nature of the material and other factors, glass fiber particles of from about 0.0001 inch to about 0.005 inch in diameter, and preferably about 0.0005 inch in diameter, will yield the desired results. Such particles advantageously have a length to diameter ratio of from about 3 to about 10,000. The glass fiber or other asperities may also be compounded in the form of chips, fibers, spheres or other convenient shapes, although fibers are generally preferable.

The asperities are compounded with the fluoroelastomer at a rate sufficient to give and maintain a high surface concentration of asperities in the finished friction facing. Preferably, about 20 to about 50 percent by weight of glass fiber particles to about 30 to about 50 percent by weight of fluoroelastomer are admixed to provide a randomly irregular macroscopic surface finish on the friction material. It may in some instances, however, be desirable to exceed these proportions, depending on the frictional characteristics desired in the finished material.

It is contemplated that carbon black will be incorporated into the compound fluoroelastomer, conveniently at the same time the asperities are incorporated. This additive is preferably added in amounts of about 12 to about 30 percent by weight of carbon black to about 30 to about 50 percent by weight of fluoroelastomer. Additionally, accelerators, stabilizers, and curing agents, inter alia, commonly used in fluoroelastomer products, will usually be compounded with the fluoroelastomer.

The asperities, carbon black, and other additives are incorporated into the fluoroelastomer by conventional mixing techniques, for example, in a Banbury mixer. Ideally, the asperities should be concentrated near the surface, or the frictionally active portion, of the fluoroelastomer matrix. However, in practicality this is difficult to achieve, and satisfactory results are obtained by intimately incorporating the asperities throughout the fluoroelastomer to obtain a random orientation of the asperities through the matrix.

The fluoroelastomer may be bonded to a core of steel or other metal by the process of copending U.S. application Ser. No. 307,420 noted above. Broadly, this process comprises incorporating CaO into the fluoroelastomer prior to curing, and then at high temperatures curing the fluoroelastomer in pressed contact with the core material. Conveniently, the CaO may be incorporated into the fluoroelastomer at the same time as are the asperities and other additives noted above.

Conventional molding techniques, such as compression transfer or injection molding, are utilized for forming the fluoroelastomer/backing plate friction element. In applying the friction material to the backing plate of the friction element, it is usually desirable to apply the friction material to the plate in an amount sufficient to obtain a finished thickness of friction material of from about 0.020 to about 0.250 inches, especially in applications where the material is utilized in clutches.

The friction material of this invention exhibits a high, stable, dynamic coefficient of friction through a wide range of sliding speeds and normal loads against a wide variety of opposing faces and finishes. For example, dynamic friction coefficients ($\mu D$) of from about 0.14 to about 0.06 at from about 2,000 to 11,000 ft/min sliding speed and from about 50 to about 680 psi of face pressure on gross area typically can be expected in friction elements comprised of the friction material of this invention.

Additionally, good static ("breakaway") coefficients of friction from about 0.17 to about 0.26 are characteristic of this fluoroelastomer friction material.

The friction material of this invention is capable of operating against mating surfaces of a variety of types, for example, hard or soft steel, cast iron, sintered metals, and ground, deburred or lapped surfaces. However, the mating surface finish may adversely affect the friction characteristics of the friction material if this surface is too roughly or too finely finished. Generally, a mating surface finish of about 20 to about 65 m$\mu$ will result in satisfactory performance of the friction material.

The fluoroelastomer friction material of this invention is further characterized by low wear and dimensional stability can be expected during extended dynamic operation. Furthermore, the material exhibits a relatively flat torque curve that "wrings in" about 10–25 percent above the dynamic torque.

The friction material of this invention will respond according to test results over a wide operating surface temperature range even up to about 680° F. In general, the material can be expected to maintain optimum response levels at bulk temperatures below about 475° F; i.e., where the average surface temperature of the friction material between operations of the friction element is below about 475° F. Maximum peak temperatures, however, may be as high as from about 560° F to about 680° F before performance of the friction material is substantially affected.

In general, effective performance of the friction material contemplates operation of the friction element under oil cooled operating conditions. However, a much wider selection of oils may be effectively employed with the fluoroelastomer friction material than with, for example, bronze.

In preparing friction elements utilizing the friction material of this invention, it will generally be found that after demolding, few if any of the asperities will be present on the frictional surface of the material. The thin elastomer coating covering the asperities must therefore be worn off to expose the asperities and hence to obtain a stable coefficient of friction for the element. This may either be done in situ, allowing the rubber coating to be worn off during an initial break-in period of the friction element in the service vehicle, or by pregrinding of the friction material before installation of the element. The amount of matrix material which must be removed to obtain a desirably stable coefficient of friction for the material as a whole will of course vary according to the specific formulation. However, it is generally advantageous to sufficiently expose a major portion of the underlying asperities to a point where these asperities are in contact with the grinding or mating surface.

Figure 1:
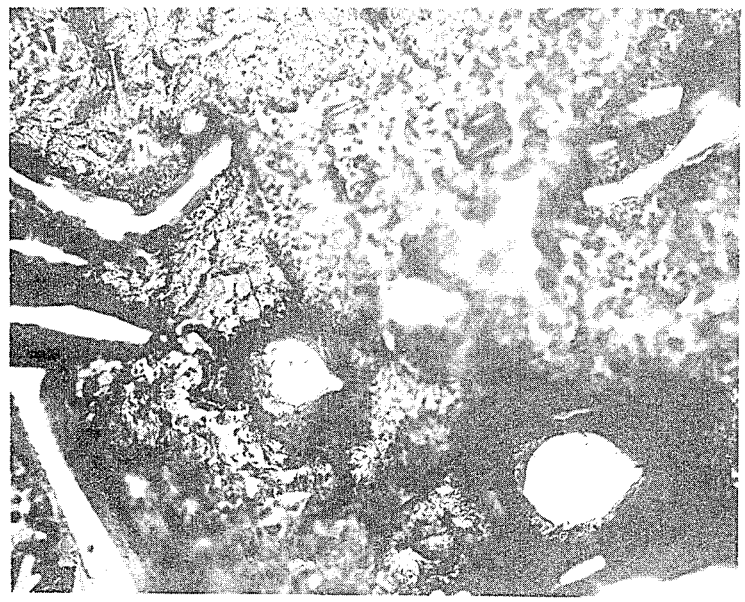
FIG. 1 is a photomicrograph (at 500X magnification)

During early use, these asperities are ground to a point where they appear to be well-worn, as shown in FIGS. 1 and 2, to obtain a stable coefficient of friction. The asperities appear to be mechanically bonded in the matrix.

The following examples are provided only to further illustrate specific friction material compositions of this invention and pertinent frictional characteristics thereof, without limiting the invention in any manner:

Example 1

| Ingredients | Amount (Parts by Weight) | Size |
|---|---|---|
| Viton E60 | 100 parts | |
| Type E "Fiberglass" | 110 parts | 0.0005" diameter |
| Carbon Black | 60 parts | |
| Accelerators Stabilizers Curing Agents | Minor amounts | |
| CaO | 5 parts | |

The above ingredients were compounded by mixing in a Banbury mixer to achieve an even dispersion of the additives into the fluoroelastomer matrix, with random orientation of the glass particles. The mixture was applied to a steel backing plate and pressed to this plate into the desired pattern under about 2,500 psi. The mixture then was cured for 30 seconds at 390° F. Sufficient mixture material was applied to the plate to give a thickness of material, when cured, of 0.050 inches/face. The cured elastomer and backing plate, i.e., clutch disc, were then postcured at 450° F for 16 hours.

It was found that the friction material possessed a Shore A Hardness of 90–95, and an ultimate tensile strength of 1,900 to 2,100 psi. The clutch friction element made by the process of Example 1 was then subjected to a wear test in an earthmoving vehicle transmission comprising 220,000 cycles, from third speed reverse to third speed forward. 0.008 inches of wear was observed per friction material face element at the conclusion of this test. The friction material was found to have an excellent thermal stability up to 475° F (bulk), and 680° F (peak).

Example 2

Full Scale Clutch Test Results
Friction Material   As in Example 1

Example 2-Continued

| Size O.D. — inches | | 12.25 | | |
|---|---|---|---|---|
| Area/Face — inches | | 31 | | |
| Faces/Clutch | | 8 | | |
| Oil Temperature | | 210°F | | |
| Cycle Time | | 30 seconds | | |
| Reaction Surfaces — Ground and Deburred Soft Steel | | | | |
| Shift | 3R | 1F | 3R | 3F |
| Input RPM | 2,000 1,800 | 1,800 | 2,000 | |
| Coefficient of Friction | | | | |
| Maximum | 0.110 | 0.110 | 0.116 | 0.112 |
| Minimum | 0.065 | 0.068 | 0.074 | 0.070 |
| Wring-In | 0.073 | 0.075 | 0.083 | 0.083 |
| Clutch Torque lb-ft/in$^2$ | | | | |
| Max. Dynamic | 11.2 | 11.7 | 13.3 | 12.6 |
| Wring-In | 12.6 | 13.0 | 14.9 | 14.9 |
| Peak HP/in$^2$ | 3.2 | 2.7 | 1.7 | 1.9 |
| Total BTU/in$^2$ | 0.65 | 0.51 | 0.48 | 0.73 |
| Plate Temperature | | | | |
| Max. °F | 494 | 443 | 360 | 390 |
| Bulk °F | 235 | 225 | 212 | 193 |

What is claimed is:

1. As a article of manufacture a friction material formed of a matrix comprising from about 30 to about 50 percent by weight of a copolymer of hexafluoropropylene and vinylidene fluoride, and from about 12 to about 30 percent by weight of carbon black; and said friction material further containing from about 20 to about 50 percent by weight of ceramic particles of from about 0.0001 inch to about 0.005 inch in effective diameter intermixed with and dispersed throughout said friction material in mechanically held nonbonded relation to provide a friction surface of said article of manufacture including the said matrix and said ceramic particles.

2. A friction material composition consisting essentially of a matrix having from about 30 to about 50 percent by weight of a copolymer of hexafluoropropylene and vinylidene fluoride, and from about 12 to about 30 percent by weight of carbon black; and said friction material further consisting of from about 20 to about 50 percent by weight of ceramic particles having a minimum size of 0.0001 inch which are dispersed throughout the copolymer matrix in mechanically held nonbonded relation and assuring a relatively high surface concentration of the ceramic particles to provide a friction surface of said friction material including said matrix and said particles.

3. The friction material composition of claim 2 wherein said particles are glass fibers of a size from about 0.0001 inch to about 0.005 inch in diameter and having a length to diameter ratio of from about 3 to 10,000.

* * * * *